C. DIEHL.
IRRIGATING GUTTER.
APPLICATION FILED JUNE 19, 1909.
958,479.
Patented May 17, 1910.
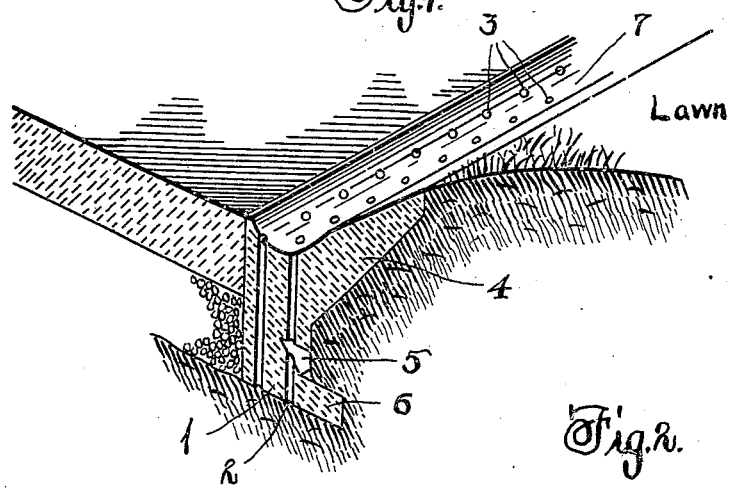
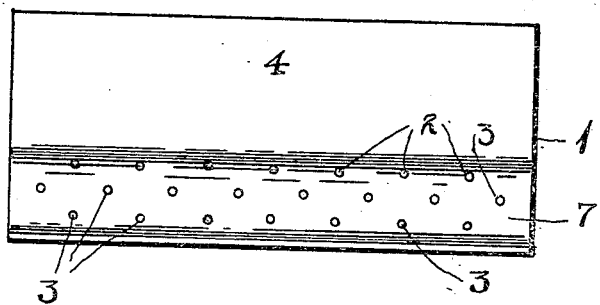
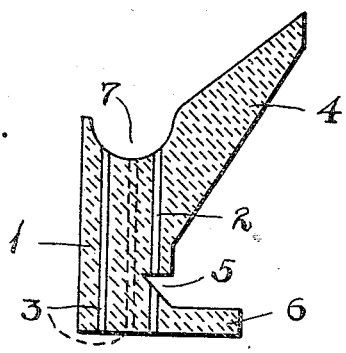
Witnesses:
Monroe E. Miller
Hazel U. Ruth
Inventor,
Charles Diehl,
By Geo. E. Tew
Attorney.

UNITED STATES PATENT OFFICE.

CHARLES DIEHL, OF CLEVELAND, OHIO.

IRRIGATING-GUTTER.

958,479.  Specification of Letters Patent.  Patented May 17, 1910.

Application filed June 19, 1909. Serial No. 503,087.

*To all whom it may concern:*

Be it known that I, CHARLES DIEHL, citizen of the United States, residing at Cleveland, in the county of Cuyahoga and State of Ohio, have invented certain new and useful Improvements in Irrigating-Gutters, of which the following is a specification.

This invention is an irrigating gutter, and has for its object to provide a suitable concrete or other gutter for the edges of side walks, around the sides of a house, below eave-troughs, etc., to carry off superfluous water and to act as an irrigator as well as adding to the appearance of the lawn.

The main feature of this gutter is a trough between the walk and lawn, or house and lawn, having a plurality of water conduits leading into the ground and a channel passing longitudinally through one row of said channels and having its opening on the side toward the lawn.

In the accompanying drawings, Figure 1 is a perspective of a section of the gutter as used at the edge of a side walk; Fig. 2 is a top plan of one of the gutter blocks; Fig. 3 is a vertical cross section thereof.

The block 1 is formed with an upper trough 7, the edge next to the lawn extending upwardly and outwardly to form a flange or coping 4 which will serve to support a lawn bank or terrace. Conduits 2 and 3 extend downwardly from the trough through the block to the ground. On the inner side of the gutter, that is, the side toward the lawn, is a longitudinal channel 5 which intersects the inner row of openings 2. The lower wall of the channel 5 inclines downwardly to a lower or base flange 6 which projects horizontally and outwardly on the lawn side.

In use, the flange or extension 4 which rests against the lawn carries superfluous water off the lawn into trough 7 which also receives water from the walk or pavement, or from the eaves and the side of the house when used around the sides of a house. From trough 7 the water flows down conduits 2 and 3 to the ground into which it soaks. Part of the water is discharged through channel 5 and is fed to the adjacent lawn as the earth dries. The base flange 6 supports the block in position and also prevents the water in channel 5 from oozing or flowing downwardly into the ground below the gutter.

The gutter will preferably be molded of cement, and in addition to its irrigating function will add to the appearance of the lawn, by keeping its edges even and supporting the same.

I claim:

1. A gutter block provided with openings extending downwardly through the same with a lateral outlet on one side, and a base flange projecting outwardly under said outlet.

2. A gutter block having a trough at the top and openings extending downwardly through the block from said trough, and an outlet channel extending along the side of the block and intersecting said openings.

In testimony whereof, I do affix my signature in presence of two witnesses.

CHARLES DIEHL.

Witnesses:
HAZEL U. RUTH,
MONROE E. MILLER.